(12) United States Patent
Kim et al.

(10) Patent No.: US 12,114,349 B2
(45) Date of Patent: *Oct. 8, 2024

(54) WIRELESS COMMUNICATION METHOD FOR SAVING POWER AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/856,040

(22) Filed: Apr. 23, 2020

(65) Prior Publication Data

US 2020/0252961 A1  Aug. 6, 2020

Related U.S. Application Data

(63) Continuation of application No. 15/523,673, filed as application No. PCT/KR2015/011639 on Nov. 2, 2015, now Pat. No. 10,667,292.

(30) Foreign Application Priority Data

Oct. 31, 2014 (KR) .................. 10-2014-0150734
Nov. 7, 2014 (KR) .................. 10-2014-0154309

(51) Int. Cl.
*H04W 74/00* (2009.01)
*H04L 5/00* (2006.01)
(Continued)

(52) U.S. Cl.
CPC ......... *H04W 74/004* (2013.01); *H04L 5/0053* (2013.01); *H04L 5/0091* (2013.01);
(Continued)

(58) Field of Classification Search
CPC ... H04W 74/004; H04W 52/02; H04W 72/04; H04W 72/042; H04W 84/12;
(Continued)

(56) References Cited

U.S. PATENT DOCUMENTS

2002/0143970 A1  10/2002  Kandala
2005/0135318 A1   6/2005  Walton et al.
(Continued)

FOREIGN PATENT DOCUMENTS

WO  2013/122424  8/2013
WO  2014/010945  1/2014

OTHER PUBLICATIONS

International Search Report for PCT/KR2015/011639 mailed on Apr. 22, 2016 and its English translation from WIPO.
(Continued)

*Primary Examiner* — Joseph A Bednash
(74) *Attorney, Agent, or Firm* — Womble Bond Dickinson (US) LLP

(57) ABSTRACT

The present invention relates to a wireless communication method for power saving and a wireless communication terminal using the same, and more particularly, to a wireless communication method for efficiently operating data transmission/reception of each terminal in a high-density environment and a wireless communication terminal using the same.

(Continued)

To this end, provided are a base wireless communication terminal, including: a transceiver configured to transmit and receive a wireless signal; and a processor configured to control an operation of the base wireless communication terminal, wherein the processor is configured to: transmit a traffic indicator map (TIM) including identifier information of at least one station which is to receive downlink data, transmit a trigger frame triggering a PS-Poll transmission of the at least one station indicated by the TIM, receive at least one PS-Poll transmitted in response to the trigger frame, and transmit downlink data to a station that transmitted the PS-Poll and a wireless communication method using the same.

8 Claims, 19 Drawing Sheets

(51) Int. Cl.
*H04W 52/02* (2009.01)
*H04W 72/04* (2023.01)
*H04W 72/0453* (2023.01)
*H04W 72/23* (2023.01)
*H04W 74/0816* (2024.01)
*H04W 84/12* (2009.01)

(52) U.S. Cl.
CPC ........... *H04W 52/02* (2013.01); *H04W 72/04* (2013.01); *H04W 72/23* (2023.01); *H04W 84/12* (2013.01); *H04W 52/0216* (2013.01); *H04W 72/0453* (2013.01); *H04W 74/0816* (2013.01); *Y02D 30/70* (2020.08)

(58) Field of Classification Search
CPC ......... H04W 52/0216; H04W 72/0453; H04W 74/0816; H04L 5/0053; H04L 5/0091; Y02D 30/70
See application file for complete search history.

(56) References Cited

U.S. PATENT DOCUMENTS

| | | |
|---|---|---|
| 2009/0016306 A1 | 1/2009 | Wang et al. |
| 2010/0014448 A1 | 1/2010 | Wentink et al. |
| 2010/0311432 A1 | 12/2010 | Lauer et al. |
| 2011/0211616 A1 | 9/2011 | Taghavi Nasrabadi et al. |
| 2014/0307650 A1* | 10/2014 | Vermani ............. H04L 27/2613 370/329 |
| 2015/0163028 A1* | 6/2015 | Tandra ................. H04L 5/0044 370/203 |
| 2016/0072654 A1* | 3/2016 | Choi ..................... H04L 5/0007 370/329 |
| 2017/0214561 A1* | 7/2017 | Lee ........................ H04L 5/0053 |
| 2018/0020475 A1 | 1/2018 | Kim et al. |

OTHER PUBLICATIONS

Written Opinion of the International Searching Authority for PCT/KR2015/011639 mailed on Apr. 22, 2016 and its English translation from WIPO.
International Preliminary Report on Patentability for PCT/KR2015/011639 issued on May 2, 2017 and its English translation from WIPO.
Notice of Allowance dated Jan. 17, 2020 for U.S. Appl. No. 15/523,673 (now published as US 2018/0020475).
Non-Final Office Action dated Sep. 9, 2019 for U.S. Appl. No. 15/523,673 (now published as US 2018/0020475).
Final Office Action dated May 17, 2019 for U.S. Appl. No. 15/523,673 (now published as US 2018/0020475).
Non-Final Office Action dated Dec. 20, 2018 for U.S. Appl. No. 15/523,673 (now published as US 2018/0020475).
Office Action dated Feb. 19, 2021 for U.S. Appl. No. 16/856,037 (now published as US 2020/0252960).
Advisory Action dated Oct. 19, 2021 for U.S. Appl. No. 16/856,037.
Office Action dated Dec. 16, 2021 for U.S. Appl. No. 16/856,037.
Office Action dated Mar. 23, 2022 for U.S. Appl. No. 16/856,037.
Office Action dated Jul. 8, 2022 for U.S. Appl. No. 16/856,037.
Final Office Action dated Dec. 1, 2022 for U.S. Appl. No. 16/856,037.
Office Action dated Mar. 30, 2023 for U.S. Appl. No. 16/856,037.
Final Office Action dated Jul. 13, 2023 for U.S. Appl. No. 16/856,037.
Non-Final Office Action dated Nov. 1, 2023 for U.S. Appl. No. 16/856,037.

* cited by examiner

WIRELESS COMMUNICATION METHOD FOR SAVING POWER AND WIRELESS COMMUNICATION TERMINAL USING SAME

CROSS-REFERENCE TO RELATED APPLICATIONS

This application is a continuation of U.S. patent application Ser. No. 15/523,673 filed on Oct. 5, 2017, which is the U.S. National Stage of the International Patent Application No. PCT/KR2015/011639 filed on Nov. 2, 2015, which claims the priority to Korean Patent Application No. 10-2014-0150734 filed in the Korean Intellectual Property Office on Oct. 31, 2014 and Korean Patent Application No. 10-2014-0154309 filed in the Korean Intellectual Property Office on Nov. 7, 2014, the entire contents of which are incorporated herein by reference.

TECHNICAL FIELD

The present invention relates to a wireless communication method for power saving and a wireless communication terminal using the same, and more particularly, to a wireless communication method for efficiently operating data transmission/reception of each terminal in a high-density environment and a wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

The present invention has an object to efficiently operate data transmission and reception of terminals in a power saving mode.

In addition, the present invention has an object to reduce the possibility of collision of data transmission of a plurality of terminals in a dense user environment and to provide a stable data communication environment.

In addition, the present invention has an object to enable a plurality of terminals to perform distributed data transmission using multiple channels.

Technical Solution

In order to achieve the objects, the present invention provides a wireless communication method and a wireless communication terminal as below.

First, an exemplary embodiment of the present invention provides a base wireless communication terminal, including: a transceiver configured to transmit and receive a wireless signal; and a processor configured to control an operation of the base wireless communication terminal, wherein the processor transmits a traffic indicator map (TIM) including identifier information of at least one station which is to receive downlink data, transmits a trigger frame triggering a PS-Poll transmission of the at least one station indicated by the TIM, receives at least one PS-Poll transmitted in response to the trigger frame, and transmits downlink data to a station that transmitted the PS-Poll.

In addition, an exemplary embodiment of the present invention provides a wireless communication method of a base wireless communication terminal, including: transmitting a traffic indicator map (TIM) including identifier information of at least one station which is to receive downlink data, transmitting a trigger frame triggering a PS-Poll transmission of the at least one station indicated by the TIM, receiving at least one PS-Poll transmitted in response to the trigger frame, and transmitting downlink data to a station that transmitted the PS-Poll.

In this case, the trigger frame triggers a PS-Poll transmission of a plurality of stations through multiple channels.

According to an embodiment, the trigger frame is configured in an RTS frame format.

In addition, the trigger frame includes identifier information indicating at least one station which is to uplink transmit the PS-Poll.

In addition, the trigger frame is transmitted at a wake time designated by the TIM.

According to an embodiment, the processor performs a backoff procedure for transmitting the trigger frame, and transmits the trigger frame when a backoff counter of the backoff procedure expires.

In addition, the PS-Poll is transmitted in an uplink orthogonal frequency domain multiple access (OFDMA).

In this case, the PS-Poll is transmitted in units of a channel or a subchannel on which the station receives the downlink data.

According to an embodiment, the PS-Poll is configured in a CTS frame format.

In addition, the trigger frame is transmitted in units of a channel, and the PS-Poll is transmitted in units of a subchannel from at least one station.

In addition, the data is transmitted in a downlink OFDMA.

According to an embodiment, configuration information of a channel or a subchannel on which the downlink data is to be transmitted is indicated by a channel indicator of the TIM.

According to another embodiment, configuration information of a channel or a subchannel on which the downlink data is to be transmitted is indicated by a channel indicator of the trigger frame.

In this case, the PS-Poll is transmitted based on channel or subchannel configuration information indicated by the channel indicator.

Advantageous Effects

According to the embodiment of the present invention, it is possible to reduce the possibility of collision of data transmissions of terminals by transmitting data request frames of the terminals through multiple channels in a dense user environment.

Also, according to the embodiment of the present invention, it is possible to increase the total resource utilization rate in the contention-based channel access system and improve the performance of the WLAN system.

Also, according to the embodiment of the present invention, data can be efficiently transmitted and received by allowing the terminal to recognize a band to be used in advance.

BEST MODE

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2014-0150734 and 10-2014-0154309 filed in the Korean Intellectual Property Office and the embodiments and mentioned items described in the respective application, which forms the basis of the priority, shall be included in the Detailed Description of the present application.

Figure 1:
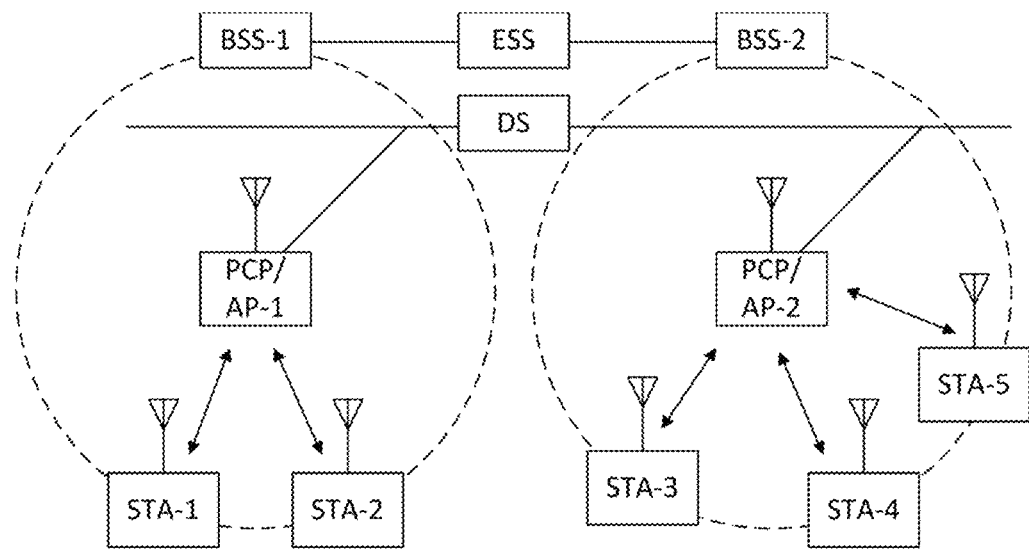
FIG. 1 is a diagram illustrating a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
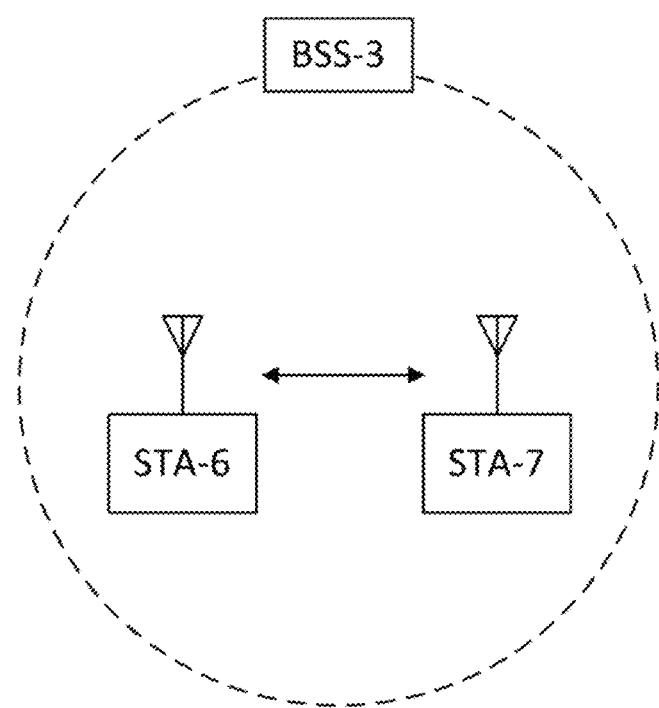
FIG. 2 is a diagram illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
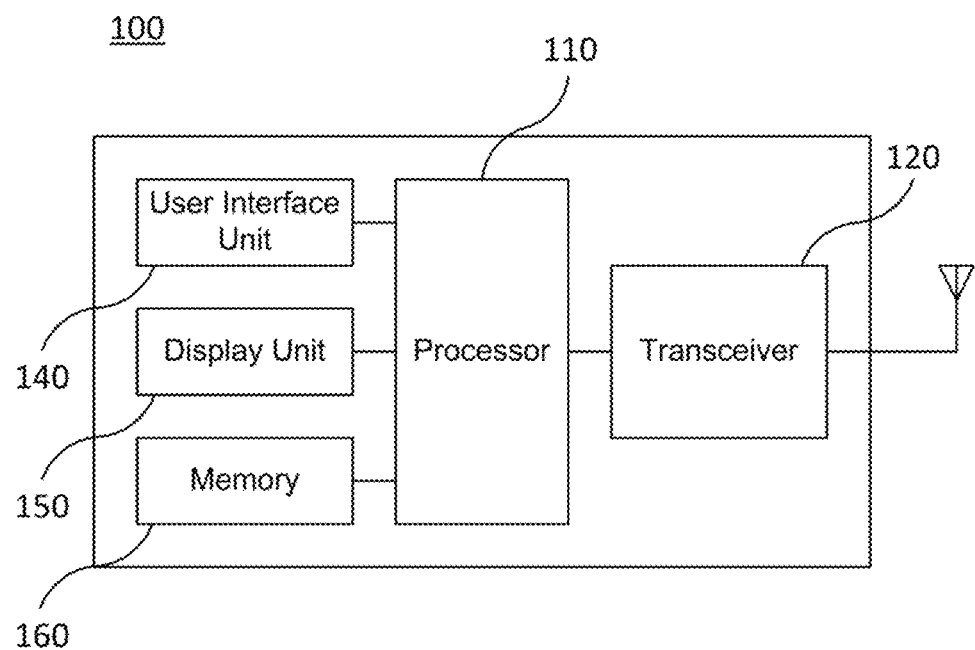
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
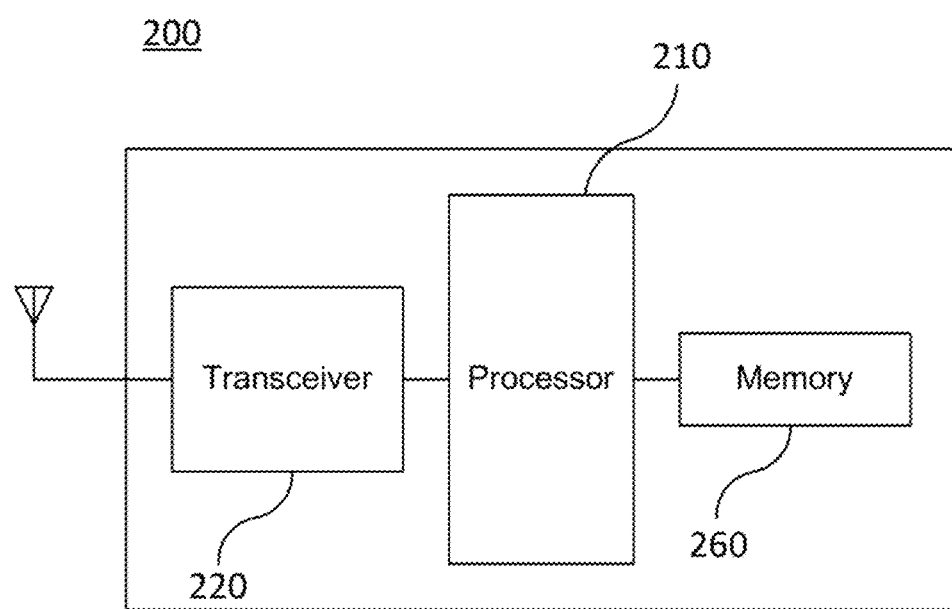
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as wireless signal transmission/reception of the AP 200 according to the embodiment of the present invention. A detailed embodiment thereof will be described below.

Figure 5:
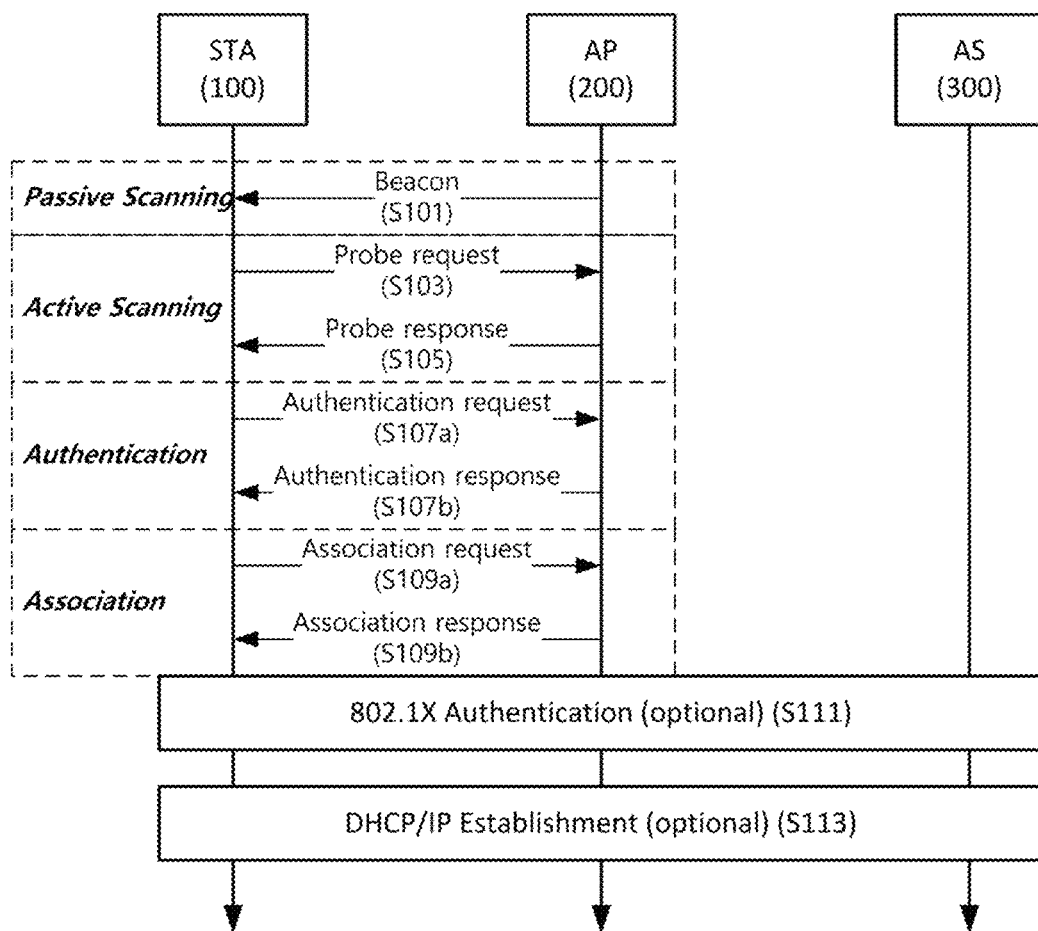
FIG. 5 is a diagram schematically illustrating a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
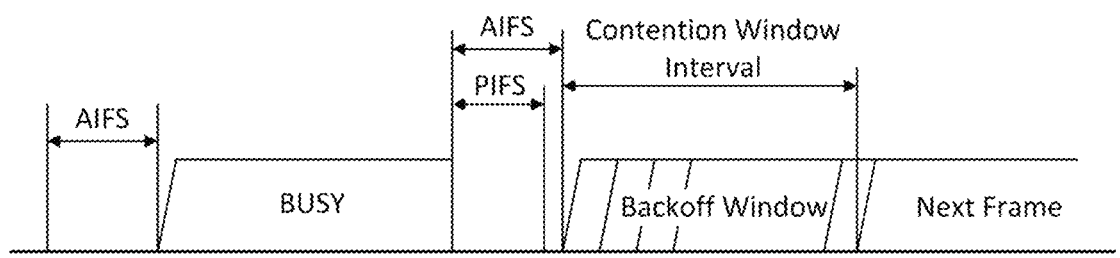
FIG. 6 is a diagram illustrating a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an interframe space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number assigned to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
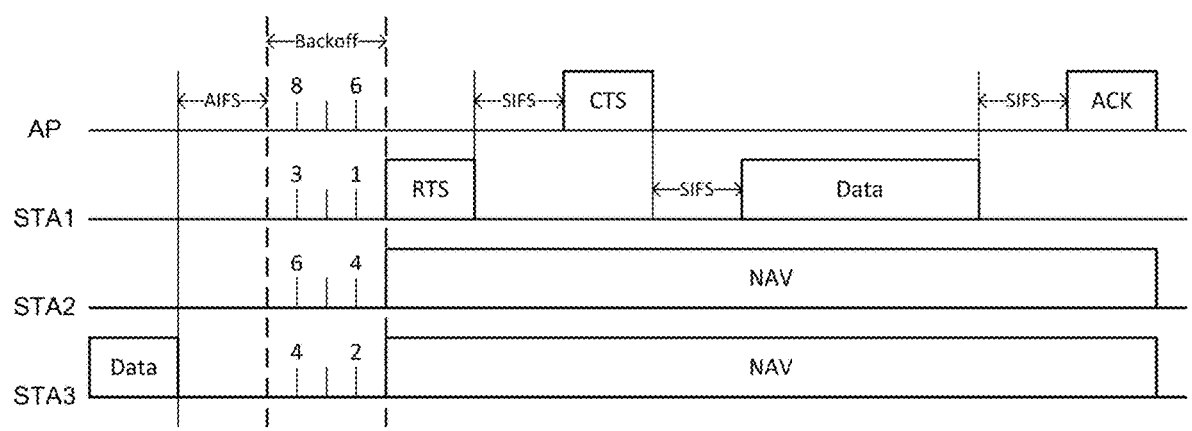
FIG. 7 is a diagram illustrating a method for performing a distributed coordination function (DCF) using a request to send (RTS) frame and a clear to send (CTS) frame.

FIG. 7 is a diagram illustrating a method for performing a distributed coordination function using a request to send (RTS) frame and a clear to send (CTS) frame.

The AP and STAs in the BSS contend in order to obtain an authority for transmitting data. When data transmission at the previous step is completed, each terminal having data to be transmitted performs a backoff procedure while decreasing a backoff counter (alternatively, a backoff timer) of a random number allocated to each terminal after an AFIS time. A transmitting terminal in which the backoff counter expires transmits the request to send (RTS) frame to notify that corresponding terminal has data to transmit. According to an exemplary embodiment of FIG. 7, STA1 which holds a lead in contention with minimum backoff may transmit the RTS frame after the backoff counter expires. The RTS frame includes information on a receiver address, a transmitter address, and duration. A receiving terminal (i.e., the AP in FIG. 7) that receives the RTS frame transmits the clear to send (CTS) frame after waiting for a short IFS (SIFS) time to notify that the data transmission is available to the transmitting terminal STA1. The CTS frame includes the information on a receiver address and duration. In this case, the receiver address of the CTS frame may be set identically to a transmitter address of the RTS frame corresponding thereto, that is, an address of the transmitting terminal STA1.

The transmitting terminal STA1 that receives the CTS frame transmits the data after a SIFS time. When the data transmission is completed, the receiving terminal AP transmits an acknowledgment (ACK) frame after a SIFS time to notify that the data transmission is completed. When the transmitting terminal receives the ACK frame within a predetermined time, the transmitting terminal regards that the data transmission is successful. However, when the transmitting terminal does not receive the ACK frame within the predetermined time, the transmitting terminal regards that the data transmission is failed. Meanwhile, adjacent terminals that receive at least one of the RTS frame and the CTS frame in the course of the transmission procedure set a network allocation vector (NAV) and do not perform data transmission until the set NAV is terminated. In this case, the NAV of each terminal may be set based on a duration field of the received RTS frame or CTS frame.

In the course of the aforementioned data transmission procedure, when the RTS frame or CTS frame of the terminals is not normally transferred to a target terminal (i.e., a terminal of the receiver address) due to a situation such as interference or a collision, a subsequent process is suspended. The transmitting terminal STA1 that transmitted the RTS frame regards that the data transmission is unavailable and participates in a next contention by being allocated with a new random number. In this case, the newly allocated random number may be determined within a range (2*CW) twice larger than a previous predetermined random number range (a contention window, CW).

In the following embodiments, a statement that a first terminal transmits an RTS frame to a second terminal may be interpreted as meaning that the first terminal transmits an RTS frame in which a transmitter address is the address of the first terminal and a receiver address is the address of the second terminal, unless otherwise described. In addition, a statement that a first terminal transmits a CTS frame to a second terminal may be interpreted as meaning that the first terminal transmits a CTS frame in which a receiver address is the address of the second terminal, unless otherwise described.

Meanwhile, the aforementioned contention-based data transmission methods can operate well in a less user environment, but the communication performance is drastically deteriorated in environments where there are many users to transmit packets. Therefore, a method for efficiently transmitting and receiving data between a plurality of terminals in a dense user environment is required. Hereinafter, a data transmission/reception method according to embodiments of the present invention will be described with reference to the drawings. In the embodiment of each drawing, the same or corresponding parts as those of the previous embodiment will be omitted.

Figure 8:
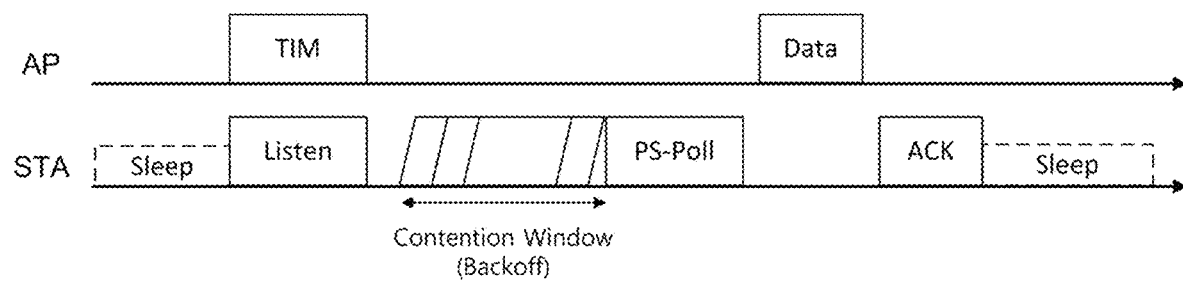
FIG. 8 is a diagram illustrating a data transmission method using TIM and PS-Poll in a power saving mode.

FIG. 8 is a diagram illustrating a data transmission method using TIM and PS-Poll in a power saving mode. WLAN terminals may switch to a power save (PS) mode for efficient power management. A STA in the PS mode may be in a doze state where data transmission/reception is not performed, and the STA may wake up and receive a traffic indicator map (TIM) when an AP periodically transmits the TIM. The AP may transmit a TIM with every beacon frame transmitted periodically, and the TIM includes identifier information of at least one target STA which is to receive downlink data.

A STA receiving the TIM extracts identifier information of the target STAs from the TIM, and identifies whether there is data to be received by the corresponding STA. If the TIM indicates that there is data to be received by the corresponding STA, the STA transmits a PS-Poll to indicate that data reception is possible. In this case, the STA may transmit the PS-Poll using the CSMA/CA method described above. That is, each STA for transmitting a PS-Poll performs the backoff procedure in a contention window period. A STA of which the backoff counter has expired transmits a PS-Poll, and the AP that received the PS-Poll transmits data to the STA. After the data reception is completed, the STA transmits an ACK frame and switches to a doze state.

FIGS. 9 to 16 illustrate various embodiments for transmitting data to the terminals in the power saving mode. According to the embodiment of the present invention, the AP may perform data transmission to the STAs in the power saving mode using a multi-channel. In addition, the AP according to the embodiment of the present invention may perform data transmission to multiple STAs through multiple channels by using an orthogonal frequency domain multiple access (OFDMA) technique. Hereinafter, in the embodiment of the present invention, a channel may be set to a bandwidth of 20 MHz, and a subchannel may be set to a bandwidth of 20 MHz or less by dividing the channel into a plurality of subchannels. However, the present invention is not limited thereto, and the bandwidths of the channel and subchannel may be set to different bandwidths depending on the system configuration.

Figure 9:
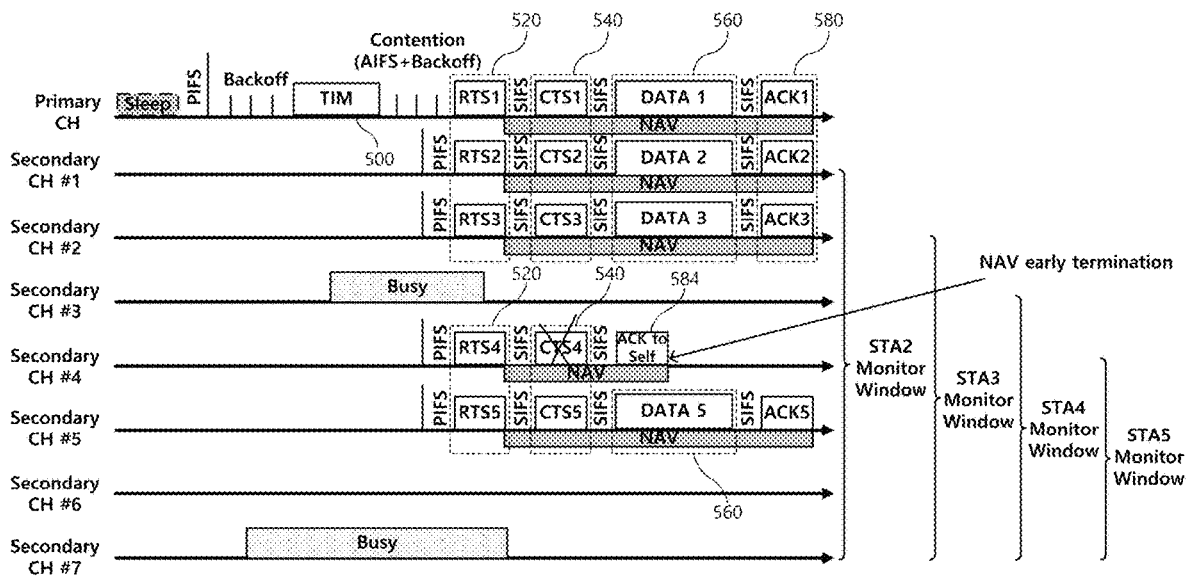
FIGS. 9 and 10 are diagrams illustrating a first embodiment of the present invention for performing data transmission to terminals in a power saving mode through multiple channels.
Figure 10:
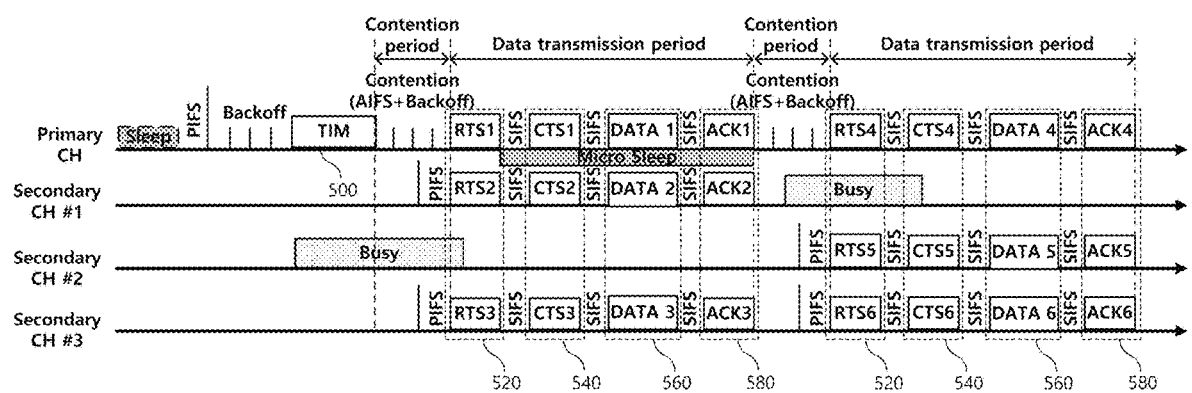

FIGS. 9 and 10 are diagrams illustrating a first embodiment of the present invention for performing data transmission to terminals in a power saving mode through multiple channels. According to the first embodiment of the present invention, the AP may transmit downlink data to a plurality of STAs in units of a channel of a basic bandwidth.

First, in the embodiment of FIG. 9, it is assumed that a terminal uses a total of 160 MHz band consisting of 8 channels and the AP attempts to transmit downlink data 560 to 5 terminals, STA1 to STA5. The AP transmits the TIM 500 to transmit the data 560 to STAs in the PS mode. The TIM 500 includes identifier information of at least one target STA to receive the downlink data 560. The TIM 500 is included in the beacon frame periodically transmitted by the AP and may be transmitted on the primary channel. The STAs receiving the TIM 500 identifies whether there is data to be received by the corresponding STA. If it is determined that there is data to be received by a particular STA, the STA should transmit a PS-Poll 540 to the AP. In this case, according to the embodiment of the present invention, downlink data 560 may be simultaneously transmitted to a plurality of STAs in a PS mode through multiple channels. Therefore, a method in which a plurality of STAs can simultaneously transmit the PS-Poll 540 and the AP can receive it is needed.

The AP transmits a trigger frame 520 that triggers a PS-Poll 540 transmission of at least one STA indicated by the TIM 500 after transmission of the TIM 500. According to an embodiment of the present invention, the trigger frame 520 may trigger PS-Poll 540 transmissions of multiple STAs through multiple channels. According to an embodiment, the trigger frame 520 may be transmitted only on a primary channel. However, according to another embodiment, the trigger frame 520 may be transmitted together on a primary channel and secondary channel(s). In this case, the AP may check whether each secondary channel is busy through a CCA procedure, and transmit the trigger frame 520 on idle secondary channels.

The trigger frame 520 may include identifier information indicating at least one STA which is to uplink transmit the PS-Poll 540. According to an embodiment of the present invention, the trigger frame 520 may be configured in an RTS frame format. If an RTS frame is transmitted as the trigger frame 520, the terminals other than the receiving target of the downlink data may set a NAV and do not interfere with each other. In this case, the trigger frame 520 includes a MAC address of the STA to receive the downlink data 560 as a receiver address. According to another embodiment of the present invention, the receiver address of the trigger frame 520 may be set to an address of the AP or a multicast address for OFDMA. According to an embodiment of the present invention, the trigger frame 520 may be transmitted on the channel on which the transmission of the downlink data 560 is to be performed. In the embodiment of the present invention, the channel on which the downlink data 560 is transmitted to each STA may be randomly set, or may be scheduled according to a predetermined rule.

According to an embodiment of the present invention, the channel on which the downlink data 560 is transmitted to each STA may be determined based on the order of the STAs indicated by the TIM 500. More specifically, based on the number of available channels in an idle state and the order of the STAs indicated by the TIM 500, the AP may determine the channel for transmitting the downlink data 560 to each STA in a round robin manner. The partial virtual bitmap of the TIM indicates whether or not data to be transmitted to each STA of the BSS is present. If data to be transmitted to a specific STA is present, the corresponding STA may be indicated as 1. If data to be transmitted to the specific STA is not present, the corresponding STA may be indicated as 0. In this case, the channel on which the downlink data 56 is to be transmitted to each STA may be determined in a round robin manner based on the order of the STAs indicated as data to be transmitted is present on the partial virtual bitmap. This channel allocation method is the same as the determination based on the result of modulo operation of the order indicated by the STA on the partial virtual bit map with the number of available channels.

According to the embodiment of FIG. 9, the identifier information of the STA1 to STA5 are sequentially indicated by the TIM 500, and the primary channel, secondary channel #1, secondary channel #2, secondary channel #4 and secondary channel #5 are idle. Therefore, the AP sequentially allocates the idle channels to STAs. That is, the AP allocates the primary channel to STA1, the secondary channel #1 to STA2, the secondary channel #2 to STA3, the secondary channel #4 to STA 4, and the secondary channel #5 to STA5, respectively. The AP may transmit the trigger frame 520 for the corresponding STA on each channel allocated to each STA.

Meanwhile, the AP may perform a backoff procedure to transmit the trigger frame 520 and transmit the trigger frame 520 when a backoff counter of the backoff procedure expires. According to an embodiment, the backoff procedure may be performed on the primary channel, and if the AP succeeds in competing on the primary channel, it performs a CCA on the secondary channels for a PIFS time before the expiration of the backoff counter of the backoff procedure to check whether each channel is available. The AP may transmit the trigger frame 520 via the primary channel and available secondary channels.

According to another embodiment of the present invention, the trigger frame 520 may be transmitted based on predetermined scheduling information. The TIM 500 transmitted by the AP may include wake time information in which STAs of the PS mode should terminate a doze state and wake up. The trigger frame 520 may be transmitted at a wake time designated by the TIM 500. The STAs in the PS mode may extract the wake time information from the received TIM 500 and wake up at the wake time to wait for a reception of the trigger frame 520.

According to an additional embodiment of the present invention, each STA in the PS mode sets a monitor window and monitors channels based on the monitor window to receive the trigger frame 520. The monitor window represents the range of channels that the corresponding STA will monitor. According to an embodiment of the present invention, the monitor window may be set based on the order of the STAs indicated by the TIM 500. Referring to FIG. 9, STA1 firstly indicated by the TIM 500 monitors only the primary channel, and STA2 secondly indicated by the TIM 500 sets and monitors the second to the subsequent channels (i.e., secondary channels #1 to #7) as a monitor window. This is because it is not possible to predict which secondary channel will be allocated to the corresponding STA depending on whether each secondary channel is busy Likewise, the thirdly indicated STA3 sets and monitors the third to the subsequent channels (i.e., secondary channels #2 to #7) as a monitor window. If the number of STAs indicated by the TIM 500 is greater than the total number of channels, the STAs whose order indicated by the TIM 500 is higher than the total number of channels are excluded from the first transmission step, and monitor windows may be allocated to the corresponding STAs according to the same rule as above in the subsequent transmission steps (e.g., the second transmission step). In this case, the order of each STA used in the subsequent transmission step may be a value excluding the number of STAs that have been allocated channels until the previous transmission step.

The STAs in the PS mode receiving the trigger frame 520 from the AP transmit the PS-Poll 540 in response thereto. Each STA indicates that the corresponding STA can receive downlink data 560 by transmitting the PS-Poll 540. According to an embodiment of the present invention, the PS-Poll 540 may be transmitted simultaneously from multiple STAs through multiple channels. The PS-Poll 540 may be transmitted in an uplink orthogonal frequency domain multiple access (OFDMA). In addition, the PS-Poll 540 may be transmitted on a channel or a subchannel where each STA will receive the downlink data 560.

The PS-Poll 540 includes the identifier information of the STA which is to receive the downlink data 560. According to an embodiment of the present invention, the PS-Poll 540 may be configured in a CTS frame format. In this case, the transmitter address of the PS-Poll 540 is set to the MAC address of the STA to receive the downlink data 560. When the trigger frame 520 and the PS-Poll 540 are transmitted in units of a channel, the STA may transmit the PS-Poll 540 on a channel on which the trigger frame 520 for the corresponding STA is received.

The AP receives at least one PS-Poll 540 transmitted by at least one STA and transmits downlink data 560 in response thereto. In this case, the AP transmits the downlink data 560 to the STA that transmitted the PS-Poll 540. The channel on which the downlink data 560 is transmitted to each STA may be set to be the same as the channel on which the PS-Poll 540 of the corresponding STA is transmitted. The AP according to the embodiment of the present invention may transmit the downlink data 560 in a downlink OFDMA. Each STA receiving the downlink data 560 from the AP transmits an ACK frame 580 in response thereto.

Referring to FIG. 9, RTS1 through RTS5 denotes trigger frames 520 transmitted to STA1 through STA5, respectively, and CTS1 through CTS5 denote PS-Poll 540 corresponding to trigger frames 520 RTS1 through RTS5, respectively. In FIG. 9, STA1 to STA3 and STA5 transmit the PS-Poll 540 in response to the reception of the trigger frame 520, but the STA4 failed to transmit the PS-Poll 540 due to the interference of the other BSS in the corresponding channel (i.e., secondary channel #3). The STA which failed to transmit the PS-Poll 540 transitions from the PS mode to the normal mode to transmit and receive data. In this case, the AP transmits an ACK-to-Self frame 584 through the channels on which the PS-Poll 540 is not received. The ACK-to-Self frame 584 is an ACK frame in which both the transmitter address and the receiver address are set to the address of the AP, and may be transmitted at a SIFS time after the transmission wait time of the PS-Poll 540 has elapsed. The AP may transmit the ACK-to-Self frame 584 to cause other STAs to early terminate the NAVs set for the corresponding channel.

Meanwhile, the RTS frame and the CTS frame are illustrated as an embodiment of the trigger frame 520 and the PS-Poll 540 in the FIG. 9, but the present invention is not limited thereto. For example, according to another embodiment of the present invention, particular trigger frame 520 including identifier information of a plurality of STAs may be defined.

Next, FIG. 10 illustrates a data transmission method when the number of STAs in the PS mode to which the downlink data 560 is to be transmitted is greater than the number of available channels. In the embodiment of FIG. 10, it is assumed that the terminal uses a total of 80 MHz band consisting of four channels, and the AP desires to transmit downlink data 560 to six terminals of STA1 to STA6.

As described above, the channel to which the downlink data 560 is to be transmitted to each STA may be determined based on the order of the STAs indicated by the TIM 500. However, if the number of STAs to which the downlink data 560 is to be transmitted is larger than the number of available channels, the AP performs a plurality of times of channel assignment to transmit the downlink data 560. According to the embodiment of FIG. 10, the identifier information of STA1 to STA6 is sequentially indicated by the TIM 500, and the primary channel, the secondary channel #1 and the secondary channel #3 are idle in the first transmission step. Therefore, the AP allocates the primary channel to the SAT1, the secondary channel #1 to the STA2, and the secondary channel #3 to the STA3 in the first transmission step. The AP may transmit the trigger frame 520 for the corresponding STA on each channel allocated to each STA. As described above, the trigger frame 520 may be transmitted based on a contention or may be transmitted based on predetermined scheduling information.

The STAs set up a monitor window and monitor the channels based on the monitor window to receive the trigger frame 520. According to the embodiment of FIG. 10, since the total number of channels is four, four STAs (i.e., STA1 to STA4) set the monitor window to monitor the channel in the first transmission step. That is, STA1 monitors the primary channel, STA2 monitors the secondary channels #2, 3 and 4, STA3 monitors the secondary channels #3 and 4, and STA4 monitors the secondary channel #4. The STAs that have been allocated a channel in the first transmission step transmit the PS-Poll 540 in response to the received trigger frame 520. The AP transmits the downlink data 560 to the STA that transmitted the PS-Poll 540. Meanwhile, STAs that have not been allocated a channel in the first transmission step may extract duration information from the trigger frame 520 and perform micro sleep based on the duration information. In this case, the duration information of the trigger frame 520 may be set to a time until the transmission of the downlink data 560 and the ACK frame 580 in the corresponding transmission step is completed.

When the first transmission step ends, the AP allocates channels to each STA through the second transmission step and transmits the downlink data 560. Referring to FIG. 10, the primary channel, the secondary channel #2 and the secondary channel #3 are idle in the second transmission step, and the AP allocates the idle channels to the STAs that have not been allocated channels in the previous transmission step. Therefore, the AP allocates the primary channel to the STA4, the secondary channel #2 to the STA5, and the secondary channel #6 to the STA6 in the second transmission step. The AP transmits the trigger frame 520 for the corresponding STA through each channel allocated to each STA, and the subsequent procedures are as described above. On the other hand, in the second transmission step, each STA sets a monitor window using an indication order excluding the number of STAs that have been allocated channels in the previous transmission step. Therefore, the STA4 monitors the primary channel, the STA5 monitors the secondary channels #2, 3 and 4, and the STA6 monitors the secondary channels #3 and 4, respectively.

FIGS. 11 to 14 illustrate a second embodiment of the present invention for performing data transmission to terminals in a power saving mode through multiple channels. According to the second embodiment of the present invention, the downlink data 562 of the AP can be transmitted in units of a subchannel.

In FIGS. 11 to 14, it is assumed that the terminal uses a total of 80 MHz band consisting of 4 channels, and one channel is divided into 4 subchannels having a 5 MHz bandwidth. However, the present invention is not limited thereto, and the number and bandwidth of the subchannels constituting each channel may be set differently. In the embodiments of FIGS. 11 to 14, the same or corresponding parts as those of the above-described embodiments of FIGS. 9 and 10 will be omitted.

According to the second embodiment of the present invention, downlink data 562 can be simultaneously transmitted to a plurality of STAs in a PS mode through multiple subchannels. When the downlink data 562 is transmitted in units of a subchannel, information on the channel configuration may be included in the TIM 500 or the trigger frame 520 transmitted by the AP. The AP identifies the available channels in an idle state and transmits the downlink data 562 on each subchannel of the available channel. As illustrated in FIGS. 11 to 14, when one channel includes four subchannels, the AP can allocate subchannels and transmit downlink data 562 to up to four STAs per an available channel. When downlink data 562 is transmitted on a subchannel, a method that a plurality of STAs can transmit PS-Polls and the AP can receive them is required.

Figure 11:
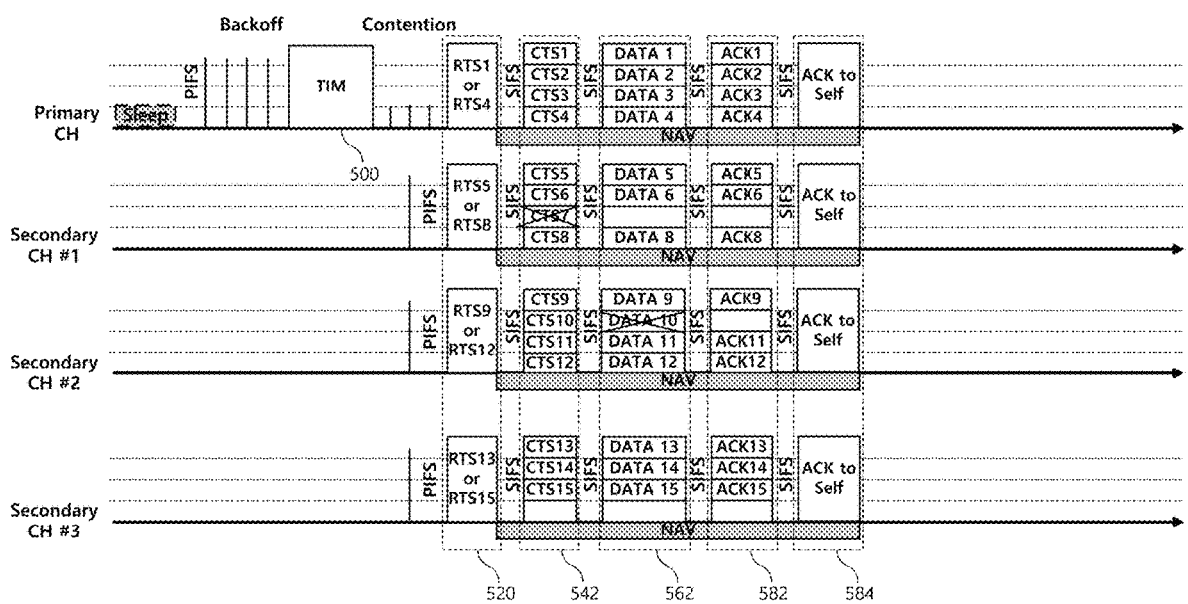
FIGS. 11 to 14 illustrate a second embodiment of the present invention for performing data transmission to terminals in a power saving mode through multiple channels.

First, according to the embodiment of FIG. 11, the PS-Poll 542 for receiving downlink data 562 in units of a subchannel may be transmitted in units of a subchannel. In FIG. 11, it is assumed that the AP intends to transmit downlink data 562 for each subchannel to 15 terminals STA1 to STA15. The AP transmits a trigger frame 520 that triggers a PS-Poll 542 transmission of at least one STA indicated by the TIM 500 after the transmission of the TIM 500. The STAs in the PS mode receive the trigger frame 520 and transmit the PS-Poll 542 in units of subchannels for receiving downlink data 562 in response thereto.

Similar to the above-described channel allocation rule, the subchannel on which downlink data 560 is to be transmitted to each STA may be determined based on the order of STAs indicated by TIM 500. That is, the AP may allocate the available subchannels in an idle state in a round-robin manner based on the order of the STAs indicated by the TIM 500. If one channel is composed of n subchannels, each subchannel can be allocated to a maximum of n STAs in one available channel.

According to an embodiment of the present invention, the trigger frame 520 is transmitted in units of a channel, and the corresponding PS-Poll 542 may be transmitted in units of a subchannel from at least one STA. As described above, according to an embodiment of the present invention, the trigger frame 520 may be configured in an RTS frame format. In this case, since the RTS frame is transmitted in units of a 20 MHz channel, the receiver address may be set to any one of the STAs assigned to each subchannel. That is, a representative RTS frame corresponding to a plurality of STAs (i.e., a STA group) can be used as the trigger frame 520. According to an embodiment, the receiver address of the RTS frame transmitted as the trigger frame 520 may be set to a MAC address of a STA that have been allocated the first subchannel or the last subchannel among the plurality of subchannels constituting the corresponding channel.

Each STA in the PS mode may set a monitor window and monitor the channels based on the monitor window to receive the trigger frame 520 as in the above embodiment. In this case, the STAs set the monitor window based on a value of dividing the order of the corresponding STA indicated by the TIM 500 by the number n of subchannels of each channel. More specifically, the monitor window can be set based on a value obtained by adding 1 to the integer value of the quotient of dividing the order of the STA by the number n of subchannels. For example, if the above operation is performed based on the STA9 indicated in the ninth by the TIM 500 and the number 4 of subchannels, 3 is obtained by adding 1 to 2, which is an integer value of 9/4=2.25. Therefore, the STA 9 sets and monitors the third to the subsequent channels (secondary channels #2 to #3) as monitor windows.

STAs in the PS mode extract the STA identifier information from the received trigger frame 520 and obtain the subchannel information allocated to the corresponding STA based on the extracted STA identifier information. As described above, when the trigger frame 520 including the identifier information of a plurality of STAs is used, the trigger frame 520 may indicate all the identifier information of the STAs that have been allocated the subchannels included in the channel on which the corresponding frame is transmitted.

When the trigger frame 520 is configured in the RTS frame format according to another embodiment, the STAs in the PS mode extract the receiver address from the received trigger frame 520, and obtain subchannel information by referring to the extracted receiver address. If the receiver address of the trigger frame 520 indicates a MAC address of a STA to which the first subchannel is allocated, each STA may identify that the downlink data 562 is transmitted on a subchannel included in the corresponding channel when the order of the corresponding STA indicated by the TIM 500 corresponds to an order within n from the order of a STA corresponding to the receiver address. Similarly, when the receiver address of the trigger frame 520 indicates the MAC address of a STA to which the last subchannel is allocated, each STA may identify that the downlink data 562 is transmitted on a subchannel included in the corresponding channel when the order of the corresponding STA indicated by the TIM 500 corresponds to an order within n before the order of a STA corresponding to the receiver address. Here, n represents the number of subchannels constituting one channel. Thus, the STA can identify which subchannel of a particular channel is assigned to the corresponding STA based on the order of the STAs indicated by the TIM 500 and the receiver address of the trigger frame 520.

STAs in the PS mode receiving the trigger frame 520 transmit the PS-Poll 542 on the allocated subchannel, that is, the subchannel to receive the downlink data 562. According to an embodiment of the present invention, the PS-Poll 540 may be transmitted simultaneously from a plurality of STAs through multiple subchannels. The PS-Poll 540 may be transmitted in uplink orthogonal frequency domain multiple access (OFDMA). The PS-Poll 542 includes identifier information of the STA to receive the downlink data 562. According to an embodiment of the present invention, the PS-Poll 542 may be configured in a CTS frame format of a subchannel bandwidth. The transmitter address of the PS-Poll 542 is set to a MAC address of the STA to receive the downlink data 562.

The AP receives the PS-Poll 542 transmitted on each subchannel, and transmits downlink data 562 on each subchannel in response thereto. In this case, the AP transmits the downlink data 562 to the corresponding STA on the subchannel in which the PS-Poll 542 is received. In other words, the subchannel on which the downlink data 562 is transmitted to each STA may be set to the same as the subchannel on which the PS-Poll 542 of the corresponding STA is transmitted. The AP according to the embodiment of the present invention may transmit downlink data 560 in the downlink OFDMA.

Each STA that receives the downlink data 562 from the AP transmits an ACK frame 582 in response thereto. In this case, the STAs may transmit the ACK frame 582 on the subchannel in which the downlink data 562 is transmitted. According to an embodiment of the present invention, the AP may further transmit an ACK-to-Self frame 584 for each channel in order to notify the legacy terminals not participating in the data transmission that the data transmission procedure is properly terminated. According to another embodiment of the present invention, the STA may omit the transmission of the ACK frame 582 on each subchannel and sequentially transmit the ACK frame on the 20 MHz channel to which the subchannel belongs.

Meanwhile, in FIG. 11, the STA that fails to transmit the PS-Poll 542 as like STA7 transitions from the PS mode to the normal mode to transmit and receive data. Also, even if the reception of the downlink data 562 is failed after the transmission of the PS-Poll 542 as like STA 10, the STA transitions from the PS mode to the normal mode to transmit and receive data.

Figure 12:
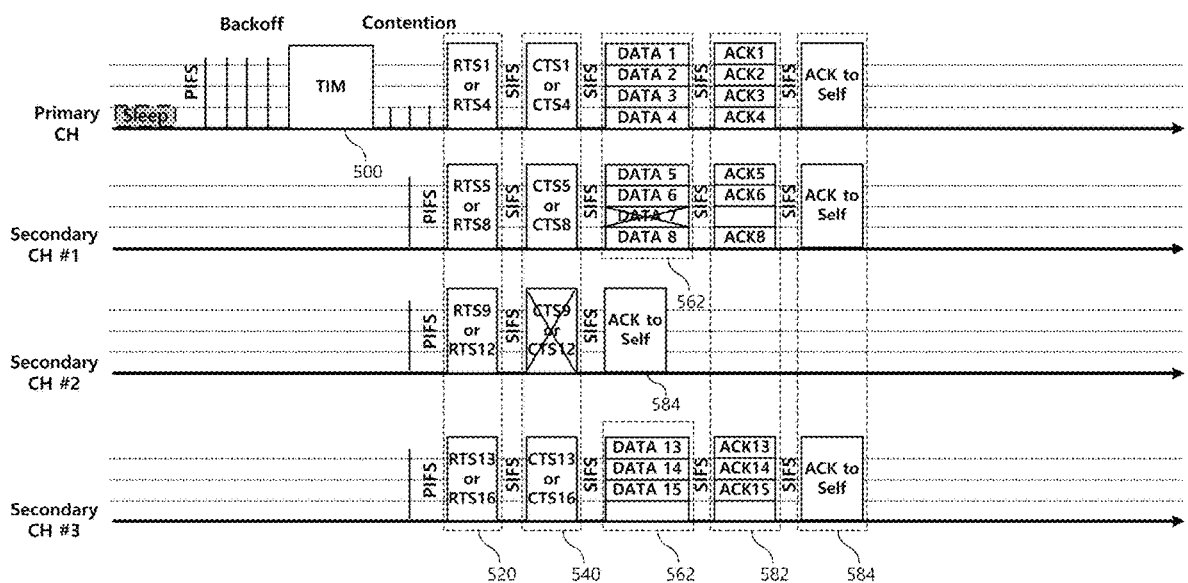

Next, according to the embodiment of FIG. 12, the PS-Poll 540 for receiving downlink data 562 in units of a subchannel may be transmitted in units of a channel. In the FIG. 12, it is assumed that the AP intends to transmit downlink data 562 for each subchannel to 15 terminals STA1 to STA15, as in FIG. 11. In the embodiment of FIG. 12, the same or corresponding parts as those of the above-described embodiment of FIG. 11 will be omitted.

According to the embodiment of FIG. 12, a representative CTS frame corresponding to a plurality of STAs may be used as the PS-Poll 540. As described above, when a representative RTS frame corresponding to a plurality of STAs (i.e., a STA group) is used as the trigger frame 520, a STA corresponding to the receiver address of the RTS frame may transmit the CTS frame, that is, PS-Poll 540 on behalf of the plurality of STAs. In this case, the CTS frame is transmitted in units of a 20 MHz channel.

The AP receives the PS-Poll 540 transmitted on each channel, and transmits the downlink data 562 on each subchannel in response thereto. In this case, the AP transmits downlink data 562 to a plurality of STAs (i.e., a STA group) that have been allocated subchannels belonging to the channel on which the PS-Poll 540 is received. Each STA that receives the downlink data 562 from the AP transmits an ACK frame 582 in response thereto. In this case, the STAs may transmit the ACK frame 582 on the subchannel in which the downlink data 562 is transmitted. According to an embodiment of the present invention, the AP may further transmit an ACK-to-Self frame 584 for each channel in order to notify the legacy terminals not participating in the data transmission that the data transmission procedure is properly terminated.

Meanwhile, when the transmission of the PS-Poll 540 fails as in the secondary channel #2 of FIG. 12, the AP transmits the ACK-to-Self frame 584 to terminate the transmission. In this case, the STAs of the STA group, that have been allocated the subchannel of the channel in which the transmission of the PS-Poll 540 fails, transitions from the PS mode to the normal mode to transmit and receive data. Also, even when the reception of the downlink data 562 is failed after the transmission of the PS-Poll 540 as like STA7, the STA transitions from the PS mode to the normal mode to transmit and receive data.

Figure 13:
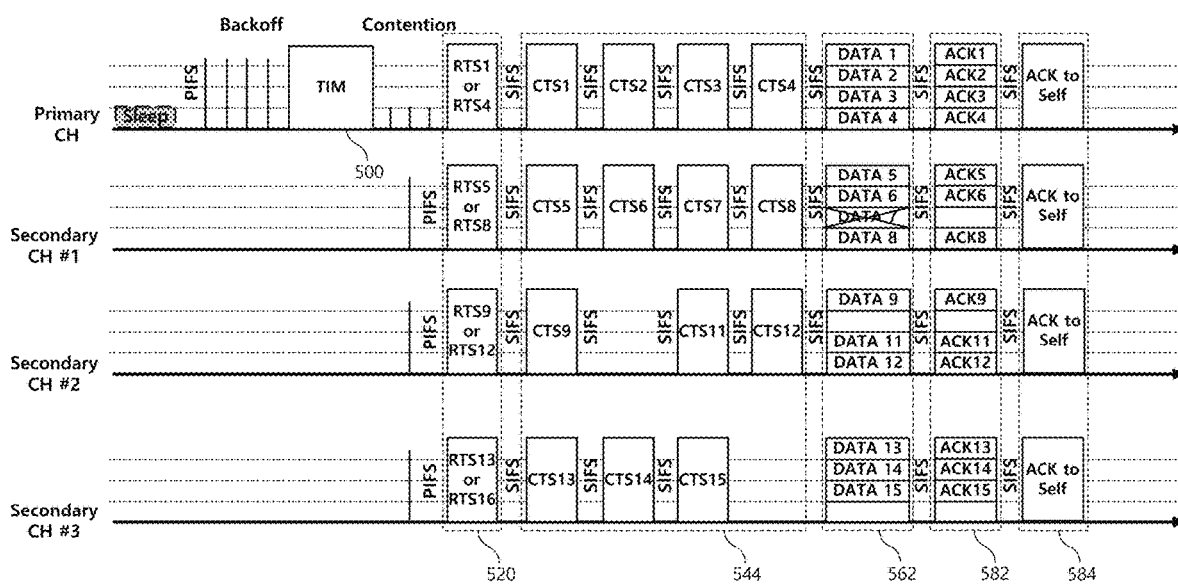

Next, according to the embodiment of FIG. 13, a plurality of PS-Polls 544 may be sequentially transmitted to receive downlink data 562 in units of a subchannel. In the FIG. 13, it is assumed that the AP intends to transmit downlink data 562 for each subchannel to 15 terminals STA1 to STA15, as in FIG. 11. In the embodiment of FIG. 13, the same or corresponding parts as those of the above-described embodiment of FIG. 11 will be omitted.

According to the embodiment of the present invention, even when downlink data 562 in units of a subchannel is transmitted, the trigger frame 520 and the corresponding PS-Poll 544 can be transmitted in units of a channel. The AP transmits a representative RTS frame corresponding to a plurality of STAs (i.e., a STA group) as the trigger frame 520, and the STAs that receive the representative RTS frame transmit the PS-Poll 544 on the channel allocated to the corresponding STA group. According to an embodiment, the PS-Poll 544 may be configured in a CTS frame format. Each STA of the STA group sequentially transmits a PS-Poll 544 in response to reception of the trigger frame 520, and the transmission order of the PS-Poll 544 of each STA may be determined according to the order of STAs indicated by the TIM 500.

In FIG. 13, a STA that is not in a state capable of receiving data or in which an interference occurs as like STA10 cannot transmit the PS-Poll 544. The STA that fails to transmit the PS-Poll 544 transitions its mode from the PS mode to the normal mode to transmit and receive data. On the other hand, in the case of secondary channel #3, which is the last channel, some subchannels may not be allocated to the STA. In order to match the data transmission time with another channel, a CTS transmission time corresponding to the number of subchannels should be secured. Therefore, if some subchannels are not allocated to STAs, the STAs that have allocated a subchannel in the last order in the corresponding channel may transmit the same PS-Poll 544 redundantly, or may transmit busy tones to prevent other STAs from interfering.

Figure 14:
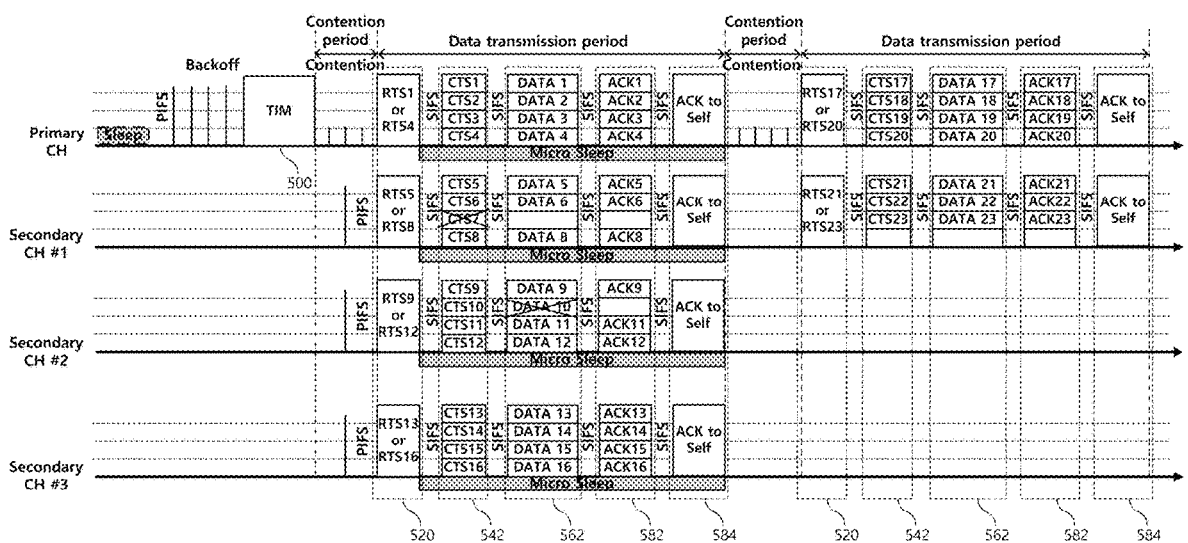

Next, FIG. 14 illustrates a data transmission method when the number of STAs in the PS mode to which the downlink data 562 is to be transmitted is larger than the number of available subchannels. In FIG. 14, it is assumed that the AP intends to transmit downlink data 562 for each subchannel to 23 terminals of STA1 to 23. In the embodiment of FIG. 14, the same or corresponding parts as those of the above-described embodiment of FIG. 11 will be omitted.

As described above in the embodiment of FIG. 10, if the number of STAs to which downlink data 562 is to be transmitted is larger than the number of available subchannels, the AP performs a plurality of times of channel assignment to transmit downlink data 562. According to the embodiment of FIG. 14, the AP transmits downlink data 562 by allocating subchannels to STA1 to STA16 in the first transmission step. Upon completion of the first transmission step, the AP allocates subchannels to the remaining STAs STA17 to STA23 through the second transmission step and transmits the downlink data 562.

Figure 15:
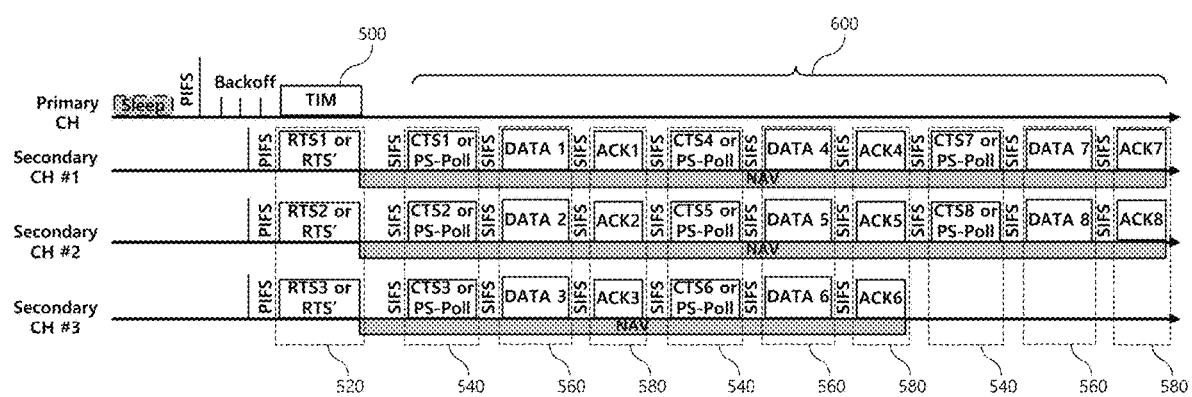
FIGS. 15 and 16 illustrate a third embodiment of the present invention for performing data transmission to terminals in a power saving mode through multiple channels.
Figure 16:
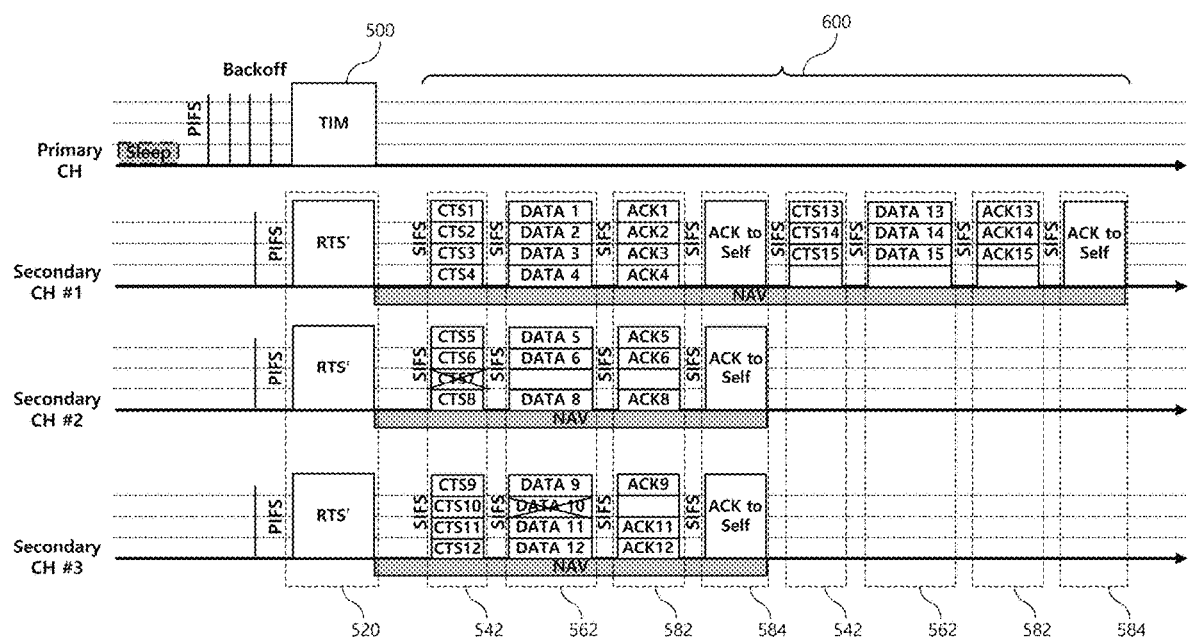

FIGS. 15 and 16 illustrate a third embodiment of the present invention for performing data transmission to terminals in a power saving mode through multiple channels.

According to the third embodiment of the present invention, the downlink data 560 and 562 of the AP can be transmitted a plurality of times during the predetermined transmission period 600. In the embodiments of FIGS. 15 and 16, the same or corresponding parts as those of the above-described embodiments of FIGS. 9 to 14 will be omitted.

First, FIG. 15 illustrates an embodiment in which downlink data 560 is transmitted in units of a channel. In FIG. 15, it is assumed that the AP intends to transmit downlink data 560 to eight terminals STA1 to STA8, and the data transmission is performed on secondary channels #1 to #3.

If the number of STAs to which the downlink data 560 is to be transmitted is larger than the number of available subchannels, the AP performs a plurality of times of channel assignment to transmit the downlink data 560. According to the embodiment of FIG. 15, the AP may transmit the downlink data 560 to the STAs in the PS mode a plurality of times during a predetermined transmission period 600. The predetermined transmission period 600 may be indicated by the TIM 500 or the trigger frame 520. In addition, identification information of the STAs to receive the downlink data 560 at each step within the predetermined transmission period 600 may also be indicated by the TIM 500 or the trigger frame 520.

Transmission of downlink data 560 for a predetermined transmission period 600 may be initiated by a trigger frame 520. According to an embodiment, the trigger frame 520 may be configured in an RTS frame format. In this case, the receiver address of the trigger frame 520 may be set to the address of the STA to receive the downlink data 560. According to another embodiment, an RTS' frame in which both the transmitter address and the receiver address are set to the address of the AP may be used as the trigger frame 520. According to yet another embodiment of the present invention, a particular frame in which a receiver address is set to a multicast address for OFDMA may be used as the trigger frame 520.

The method in which the downlink data 560 is transmitted in each step is the same as in the above-described embodiment. However, according to the embodiment of FIG. 15, when the transmission of the downlink data 560 is completed in the previous transmission step, the next transmission step may be started immediately without any additional channel contention or scheduling. That is, the next transmission step may be started immediately a SIFS time after the transmission of the downlink data 560 and transmission of the ACK frame 580 of the previous transmission step is completed. In this case, the next transmission step starts when each STA that has been allocated a channel in the corresponding transmission step transmits the PS-Poll 540.

This data transmission method may also be used for downlink data 562 transmission in units of a subchannel. In FIG. 16, it is assumed that the AP intends to transmit downlink data 562 to 15 terminals of STA1 to STA15, and data transmission is performed on each subchannel of secondary channels #1 to #3.

Identification information of the STAs to receive the downlink data 562 on the subchannels at each step within the predetermined transmission period 600 may be indicated by the TIM 500 or the trigger frame 520. Transmission of downlink data 562 for a predetermined transmission period 600 is initiated by the trigger frame 520. In each step, the AP transmits downlink data 562 to a plurality of STAs on each subchannel. When the transmission of the downlink data 562 is completed in the previous transmission step, the next transmission step starts immediately without any additional channel contention or scheduling. That is, the next transmission step may be started immediately a SIFS time after the transmissions of the downlink data 562, the ACK frame 582 and the ACK-to-Self frame 584 of the previous transmission step are completed. The next transmission step starts when each STA which has been allocated subchannel in the corresponding transmission step transmits a PS-Poll 542.

Figure 17:
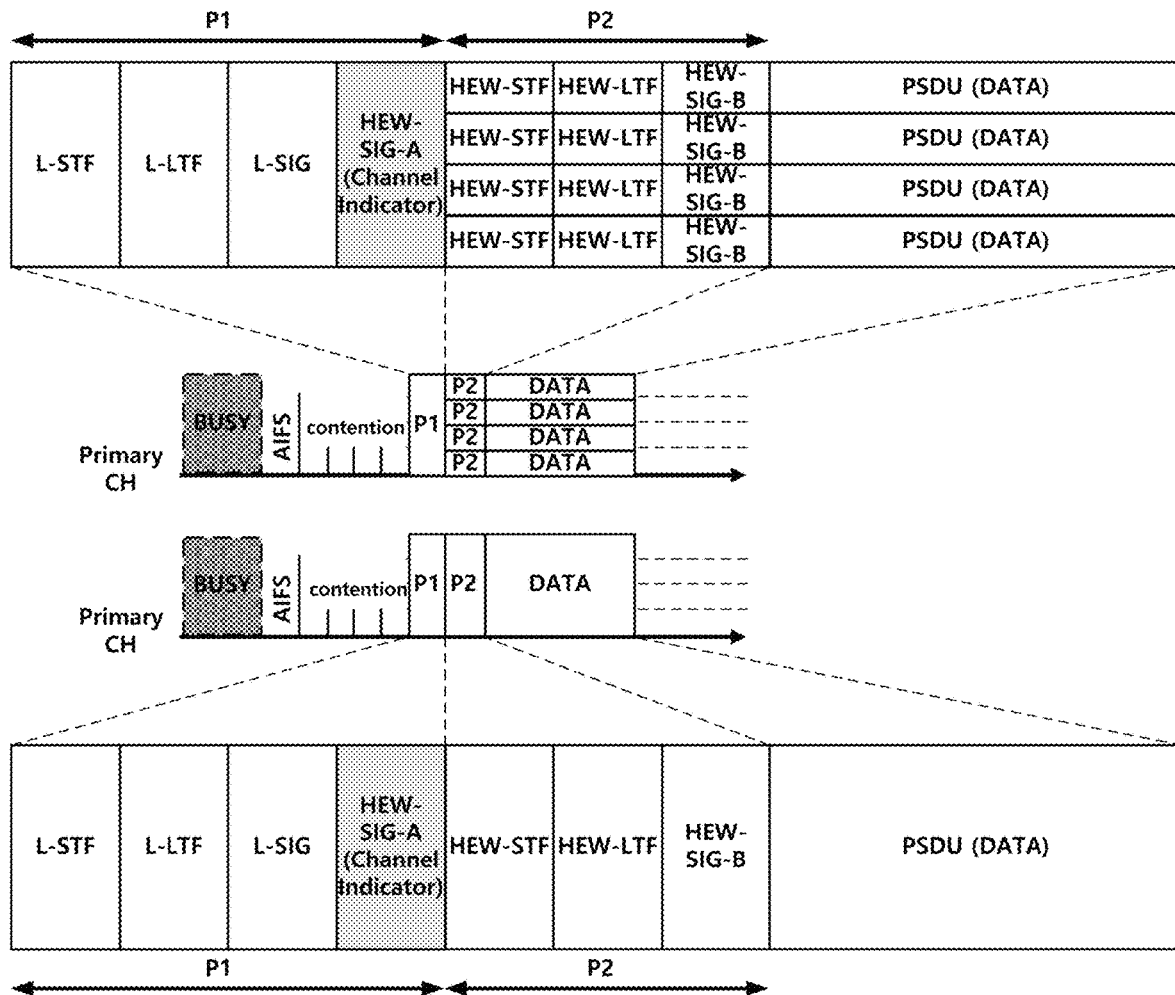
FIGS. 17 to 19 are diagrams illustrating a method of indicating a channel configuration and a transmission bandwidth in OFDMA transmission using multiple channels.
Figure 18:
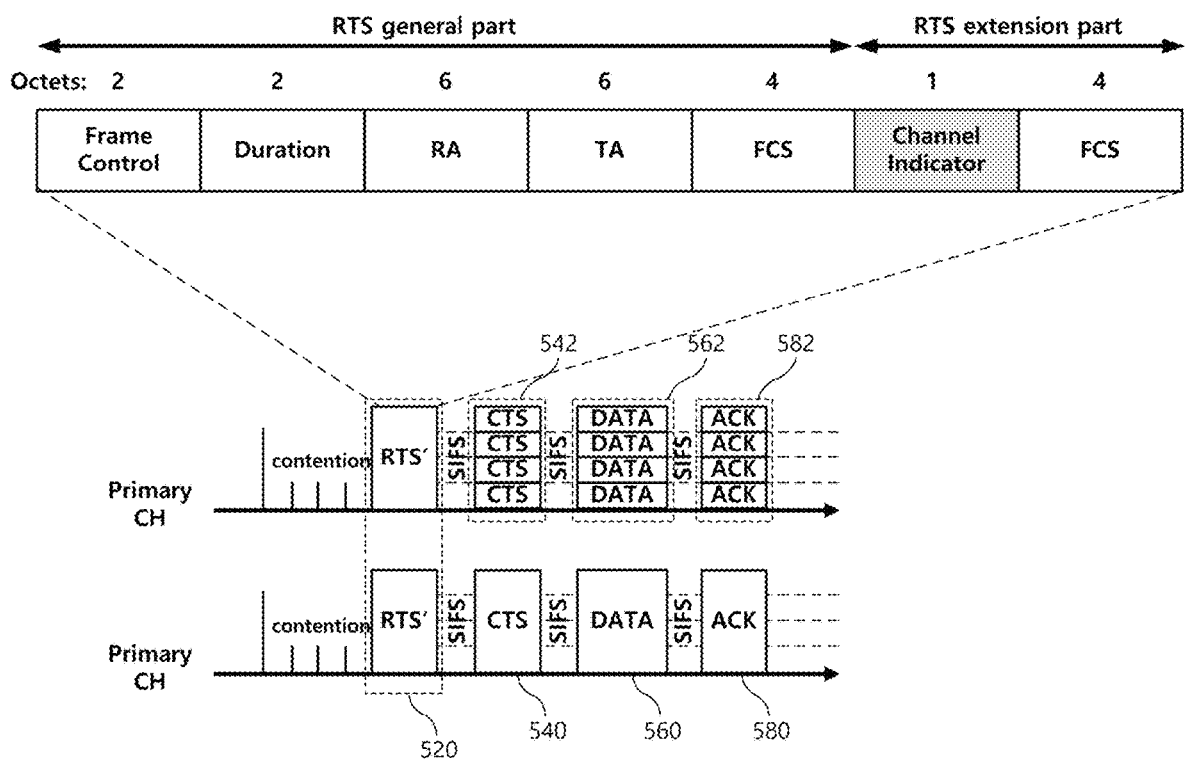
Figure 19:
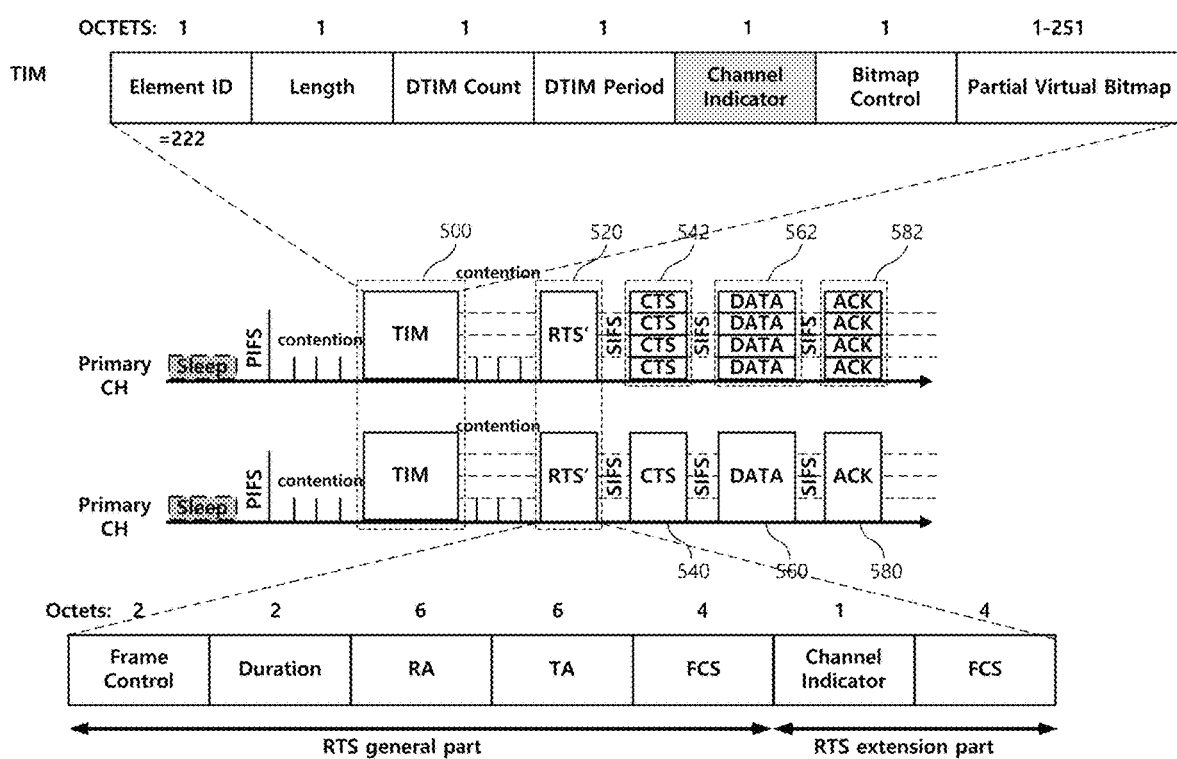

FIGS. 17 to 19 are diagrams illustrating a method of indicating a channel configuration and a transmission bandwidth in OFDMA transmission using multiple channels. In order to perform data transmission in units of a channel or a subchannel as in the above-described embodiment, information on the channel configuration used by the terminals should be transferred.

FIG. 17 illustrates a method of indicating channel configuration information through a packet preamble of downlink data according to an embodiment of the present invention. Referring to FIG. 17, a data packet includes a first preamble P1 and a second preamble P2. The first preamble P1 includes a legacy short training field (L-STF), a legacy long training field (L-LTF), a legacy signal field (L-SIG) and a HEW SIG-A defined in a non-legacy wireless LAN system. The first preamble P1 is transmitted on the 20 MHz channel band, and both the legacy terminal and the non-legacy terminal can receive it.

According to an embodiment of the present invention, the HEW SIG-A of the first preamble P1 may include a channel indicator indicating a channel or a subchannel configuration in which data transmission is to be performed. The channel indicator indicates whether the data of the corresponding packet is transmitted in units of 20 MHz channel or transmitted through n subchannels, respectively. If one channel of the 20 MHz band is divided into four subchannels having a bandwidth of 5 MHz, the channel indicator may be composed of at least four bits B1, B2, B3 and B4.

A predetermined bit of the channel indicator, such as the first bit B1, indicates whether the data is transmitted on a 20 MHz channel or on a 5 MHz subchannel. That is, when B1 is 1, data may be transmitted on a 5 MHz subchannel, and when B1 is 0, data may be transmitted on a 20 MHz channel. If B1 is set to 0, that is, if the data is transmitted on a 20 MHz channel, the other bits B2, B3, B4 of the channel indicator may not be used. If B1 is set to 1, that is, when data is transmitted on a 5 MHz subchannel, the other bits B2, B3, and B4 of the channel indicator indicate terminal allocation information of each subchannel.

More specifically, when four subchannels constituting one channel are referred to as ch1, ch2, ch3 and ch4, the subchannel allocation information according to the index value of the channel indicator may be set as shown in Table 1 below. In the channel allocation table of Table 1 below, the same bracketed subchannels are allocated to the same user (i.e., STA).

TABLE 1

| Index | Channel Allocation Table | Number of allocated terminals |
| --- | --- | --- |
| 0 | {ch1}, {ch2}, {ch3}, {ch4} | 4 |
| 1 | {ch1}, {ch2, ch3}, {ch4} | 3 |
| 2 | {ch1}, {ch2}, {ch3, ch4} | 3 |
| 3 | {ch1, ch2}, {ch3}, {ch4} | 3 |
| 4 | {ch1, ch2}, {ch3, ch4} | 2 |
| 5 | {ch1}, {ch2, ch3, ch4} | 2 |
| 6 | {ch1, ch2, ch3}, {ch4} | 2 |
| 7 | {ch1, ch2, ch3, ch4} | 1 |

According to the embodiment of the present invention, the other bits B2, B3 and B4 of the channel indicator are set to binary values corresponding to the index value of the channel indicator. For example, when the index value is 3, B2, B3, and B4 are set to 011. When the index value is 7, B2, B3, and B4 are set to 111. Meanwhile, the channel allocation table and index values shown in Table 1 are examples of the present invention, and the present invention is not limited thereto. According to the embodiment of the present invention, the number and the bandwidth of the subchannels constituting each channel may be set differently, and the specific configuration of the channel indicator may be set differently according to the number and the bandwidth of the subchannels.

The terminal (i.e., the STA) receiving the channel indicator receives the second preamble P2 and data (i.e., DATA) in accordance with the channel indicator information. That is, the STA receives the second preamble P2 and data in units of a 20 MHz channel or a subchannel of 20 MHz or less based on the channel configuration information indicated by the channel indicator. If the predetermined bit B1 of the channel indicator is set to 0, each of the fields (i.e., HEW-STF, HEW-LTF, and HEW SIG-B) of the second preamble P2 and data are transmitted on 20 MHz band. However, when the predetermined bit B1 of the channel indicator is set to 1, each of the fields (i.e., HEW-STF, HEW-LTF, and HEW SIG-B) of the second preamble P2 and data are transmitted on each subchannel.

FIG. 18 illustrates a method of indicating channel configuration information and transmission bandwidths of an OFDMA transmission through a trigger frame 520 transmitted by an AP according to another embodiment of the present invention. The trigger frame 520 triggers the PS-Poll 540, 542 transmissions of the STAs in the PS mode. According to an embodiment of the present invention, the trigger frame 520 may include a channel indicator indicating the configuration information of the channel or subchannel on which the downlink data 560, 562 is to be transmitted. That is, the channel indicator of the trigger frame 520 indicates whether the AP transmits downlink data 560 in units of a 20 MHz channel or transmits downlink data 562 through n subchannels, respectively.

As in the aforementioned embodiment, the trigger frame 520 may be configured in the RTS frame format. In this case, the trigger frame 520 transmitted by the non-legacy terminal, that is, the RTS' may include an RTS general part and an RTS extension part. The RTS general part may be configured in the same format as the legacy RTS frame, and the receiver address may indicate the addresses of the STAs to receive the downlink data 560, 562. According to another embodiment of the present invention, the receiver address may be set equal to the address of the AP, or may be set to a multicast address for OFDMA. In addition, the RTS extension part is a newly added configuration in the non-legacy terminal, and includes a channel indicator field. The specific method of expressing the channel configuration information of the channel indicator is as described in Table 1.

The STAs receiving the trigger frame 520 from the AP extract channel indicator information from the trigger frame 520. Each STA transmits a PS-Poll 540, 542 based on the channel configuration information indicated by the channel indicator. Then, the STAs receive downlink data 560 and 562 in units of a 20 MHz channel or in units of a subchannel of a 20 MHz or less based on the channel configuration information indicated by the channel indicator. If the predetermined bit B1 of the channel indicator is set to 0, the downlink data 560 is transmitted on the 20 MHz band. However, when the predetermined bit B1 of the channel indicator is set to 1, the downlink data 562 is transmitted on each subchannel. The STAs transmit ACK frames 580 and 582 in response to the received downlink data 560 and 562.

FIG. 19 illustrates a method of indicating channel configuration information and transmission bandwidths of an OFDMA transmission through a TIM 500 transmitted by an AP according to yet another embodiment of the present invention. According to an additional embodiment of the present invention, the TIM 500 may include a channel indicator indicating configuration information of the channel or subchannel on which the downlink data 560, 562 is to be transmitted. In the embodiment of FIG. 19, the same or corresponding parts as those of the embodiment of FIG. 18 will be omitted.

According to an embodiment of the present invention, the TIM 500 includes a channel indicator field. The specific method of expressing the channel configuration information of the channel indicator is as described in Table 1. The STAs receiving the TIM 500 from the AP extract channel indicator information from the TIM 500. According to an embodiment, the channel indicator information may also be transmitted redundantly through the trigger frame 520 transmitted by the AP. Each STA transmits a PS-Poll 540, 542 based on the channel configuration information indicated by the channel indicator. Then, the STAs receive downlink data 560 and 562 in units of a 20 MHz channel or in units of a subchannel of 20 MHz or less based on the channel configuration information indicated by the channel indicator. The STAs transmit ACK frames 580 and 582 in response to the received downlink data 560 and 562.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

Mode for Invention

As above, related features have been described in the best mode.

Industrial Applicability

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, the terminal comprising:
a transceiver; and
a processor,
wherein the processor is configured to:
receive a preamble of a wireless frame through the transceiver,
wherein the preamble comprises a L-STF(Legacy Short Training Filed), a L-LTF(Legacy Long Training Field), a L-SIG(Legacy Signal Field) and a specific SIG field,
wherein the specific SIG field includes a specific index among a plurality of indices,
wherein each of the plurality of indices corresponds to each of pre-configured resource unit sets including a plurality of resource units and a pre-configured number of at least one terminal for each of the pre-configured resource unit sets,
wherein sizes of two or more resource units among the plurality of resource units included in a specific resource unit set are different from each other when the specific resource set among the pre-configured resource unit sets is indicated by the specific index among the plurality of indices, and
wherein each of two or more terminals is allocated to the plurality of resource units indicated by the specific index when the two or more terminals are indicated by the specific index among the plurality of indices, and
receive a data based on a pre-configured resource unit set for the plurality of resource units and the pre-configured number of the at least one terminal indicated by the specific index.

2. The wireless communication terminal of claim 1, wherein the specific index indicates whether a transmission of the data is performed in the plurality of resource units less than a 20 MHz channel.

3. The wireless communication terminal of claim 1, wherein the preamble is received in units of a 20 MHz channel.

4. The wireless communication terminal of claim 1, wherein each of the pre-configured resource unit sets is related to a size of each of the plurality of resource units and an arrangement of the plurality of resource units.

5. A wireless communication method of a wireless communication terminal, the method comprising:
receiving a preamble of a wireless frame,
wherein the preamble comprises a L-STF(Legacy Short Training Filed), a L-LTF(Legacy Long Training Field), a L-SIG(Legacy Signal Field) and a specific SIG field,
wherein the specific SIG field includes a specific index among a plurality of indices,
wherein each of the plurality of indices corresponds to each of pre-configured resource unit sets including a plurality of resource units and a pre-configured number of at least one terminal for each of the pre-configured resource unit sets,
wherein sizes of two or more resource units among the plurality of resource units included in a specific resource unit set are different from each other when the specific resource set among the pre-configured resource unit sets is indicated by the specific index among the plurality of indices, and
wherein each of two or more terminals is allocated to the plurality of resource units indicated by the specific index when the two or more terminals are indicated by the specific index among the plurality of indices; and
receiving a data based on a pre-configured resource unit set for the plurality of resource units and the pre-configured number of the at least one terminal indicated by the specific index.

6. The method of claim 5, wherein the specific index indicates whether a transmission of the data is performed in the plurality of resource units less than a 20 MHz channel.

7. The method of claim 5, wherein the preamble is received in units of a 20 MHz channel.

8. The method of claim 5, wherein each of the pre-configured resource unit sets is related to a size of each of the plurality of resource units and an arrangement of the plurality of resource units.

* * * * *